July 21, 1936.  K. K. NAHIGYAN  2,048,403
GAS SCRUBBER
Filed July 16, 1934

Inventor
KEVORK K. NAHIGYAN
By Albert G. Blodgett
Attorney

Patented July 21, 1936

2,048,403

UNITED STATES PATENT OFFICE 2,048,403

GAS SCRUBBER

Kevork K. Nahigyan, Worcester, Mass., assignor to Riley Stoker Corporation, Worcester, Mass., a corporation of Massachusetts Application July 16, 1934, Serial No. 735,444

12 Claims. (Cl. 261—112)

This invention relates to gas scrubbers, and more particularly to scrubbers having deflecting members located in the path of the gas and supplied with liquid from an overhead tank.

Apparatus of this type is frequently used for cleaning the flue gas from furnaces, and in such service various difficulties are encountered. The gas usually contains sulphur oxides and other impurities which are very corrosive, particularly in the presence of moisture, and this results in a rapid destruction of the bottom wall of the tank, unless the tank is formed of very expensive material. Since this tank ordinarily provides a support from which the deflecting members are suspended, any substantial corrosion thereof will endanger the entire structure. In some installations the pressure of the gas varies over a wide range, particularly when the gas flow is produced by mechanical fans, and this tends to produce a considerable variation in the rate at which the liquid is supplied to the deflecting members. It has previously been proposed to form the tank in sections and thus reduce the number of patterns required for various tank widths. A still further reduction is desirable from the viewpoint of economical manufacture. In prior constructions the tank sections have been joined along straight lines which intersect the openings through which the deflecting members are inserted or withdrawn. This has not only weakened the structure, but it has also rendered it difficult to provide tight joints between the various parts.

It is accordingly one object of the invention to provide a gas scrubber having a liquid supply tank which will be thoroughly protected from the corrosive action of the gas.

It is a further object of the invention to provide a gas scrubber having a liquid supply tank which will form a strong support for deflecting members therebeneath, and which can be constructed of comparatively inexpensive material without danger of corrosion.

It is a further object of the invention to provide a gas scrubber having simple and effective means for stabilizing the flow of liquid to the deflecting members despite variations in the gas pressure.

It is a further object of the invention to provide a gas scrubber having a sectional supply tank so constructed as to reduce the number of patterns required for various tank widths.

It is a further object of the invention to provide a gas scrubber having a sectional supply tank so constructed as to strengthen the sections and facilitate the attainment of tight joints between the sections.

With these and other objects in view, as will be apparent to those skilled in the art, the invention resides in the combination of parts set forth in the specification and covered by the claims appended hereto.

Referring to the drawing illustrating one embodiment of the invention, and in which like reference numerals indicate like parts, Fig. 1 is a top plan view of a gas scrubber, a portion being shown in section on the line 1—1 of Fig. 2;

Figure 1:
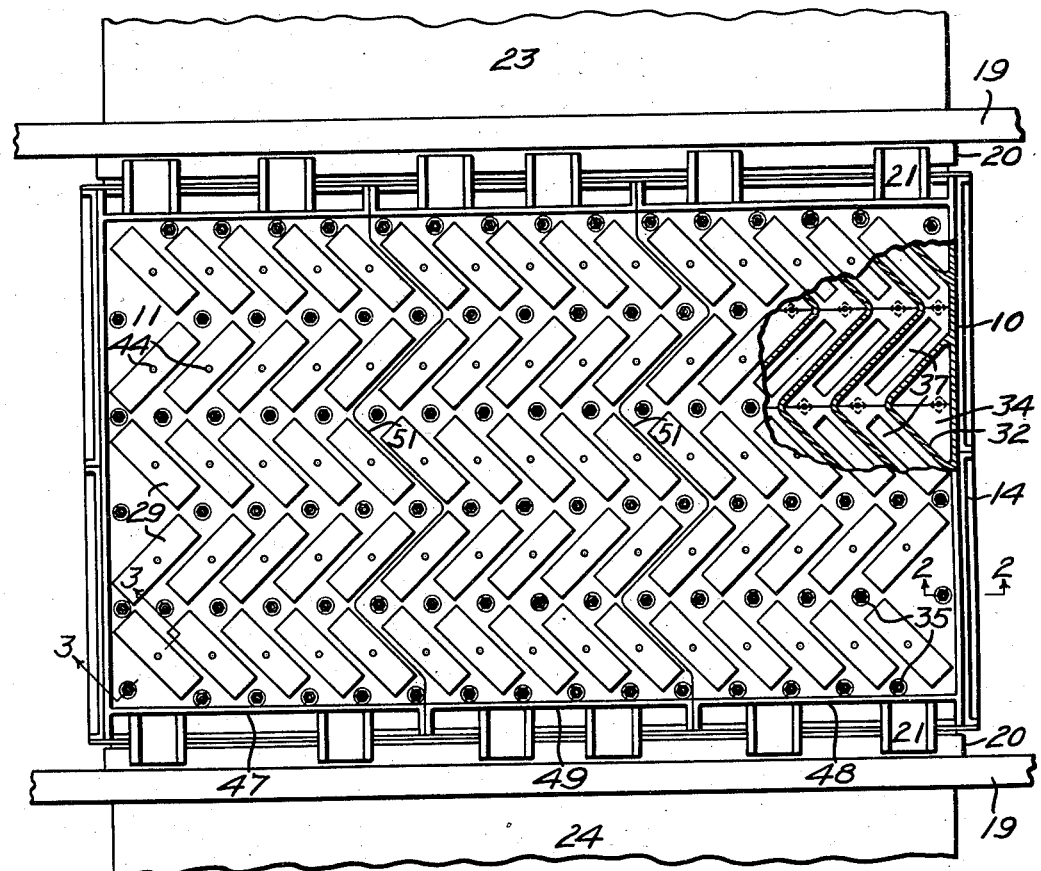
Figure 3:
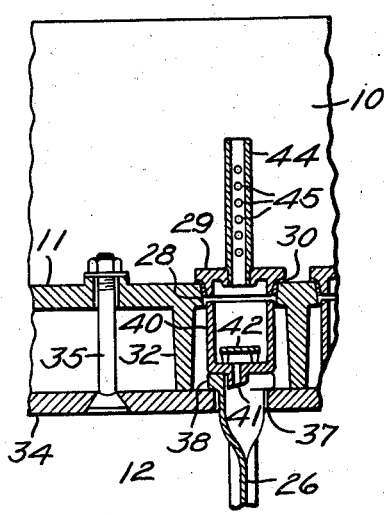
Fig. 3 is an enlarged section on the line 3—3 of Fig. 1.
Figure 2:
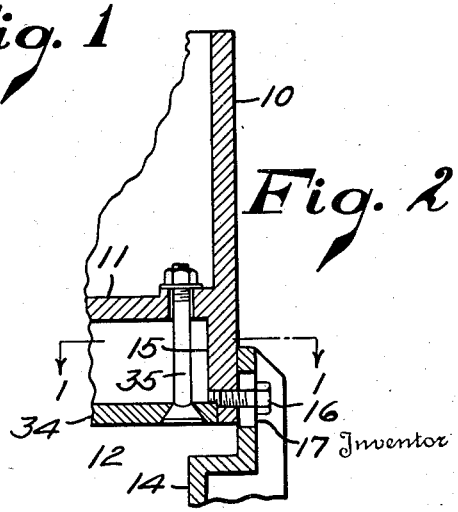
Fig. 2 is an enlarged section on the line 2—2 of Fig. 1.

In the drawing I have shown a gas scrubber of the general type disclosed in the patent to Fred H. Daniels et al., No. 1,974,768, granted September 25, 1934. The embodiment illustrated comprises a tank 10 open at the top and provided with a horizontal bottom wall 11. The tank is mounted above a gas passage 12 having side walls formed by vertical plates 14. The upper edges of these plates overlap downwardly-extending flanges 15 at the sides of the tank, and the plates are held in contact with the flanges by screws 16 which pass through vertical slots 17 in the plates. This construction allows the plates to expand and contract freely with changes in temperature. The tank 10 is supported by means of two transverse beams 19 having horizontal ledges 20, the ends of the tank having lugs 21 which rest upon the ledges. The gas is delivered to the passage 12 by means of an inlet duct 23 and leaves through an outlet duct 24.

In order to clean the gas as it flows through the passage 12, I provide a group of vertical deflector plates 26 mounted in the passage and supplied with liquid from the tank 10. These plates are preferably mounted at an angle to the general direction of the gas flow and arranged in transverse rows, the plates in adjacent rows being inclined in opposite directions, thus providing a series of narrow zig-zag passages for the gas.

The deflector plates 26 are supported at their upper ends by the tank 10 and they are preferably removable upwardly through the bottom wall 11 of the tank. Such removal is permitted by providing a slot 28 in the wall 11 directly above each deflector plate, each slot being normally closed by a cover plate 29 sealed to the wall by means of a gasket 30 in the manner disclosed in my prior Patent No. 1,984,690, granted December 18, 1934. Vertical ribs 32 are preferably provided on the lower face of the wall 11, these ribs being arranged in a zig-zag formation between and parallel to the deflector plates. The ribs 32 greatly strengthen the bottom wall of the tank and enable it to withstand the load imposed by the weight of the deflector plates.

In order to prevent corrosion and consequent weakening of the wall 11 by the action of the gas, I provide a flat horizontal liner plate 34 of corrosion resisting material. This plate forms the upper wall of the gas passage 12, and it is held against the lower edges of the ribs 32 by means of bolts 35 which extend through the plate and the wall 11. These bolts are preferably of corrosion resisting material, and they are shown arranged in transverse rows, each bolt being located near the ends of the adjacent cover plates 29. As shown in Fig. 1, each liner plate 34 is divided into sections in line with the transverse rows of bolts. This construction facilitates manufacture and assembly of the various parts.

The liner plate 34 is provided with slots 37 to receive the upper ends of the deflector plates 26, these slots 37 being somewhat narrower than the slots 28 and located directly beneath them. The deflector plates are formed with horizontally projecting lugs 38 which engage the upper surface of the plate 34 at the edges of the slots 37.

Above each deflector plate and preferably supported thereon is a receptacle 40 open at the top and provided with orifices 41 in its bottom wall through which liquid is distributed to the deflector plate therebeneath. A horizontal baffle plate 42 is mounted in each receptacle to prevent undue agitation or surging of the liquid therein. Liquid is supplied to each receptacle by a suitable metering device associated with each cover plate 29. For this purpose I have shown a vertical tube 44 mounted in an opening in each cover plate and extending upwardly therefrom. Each tube is preferably open at the top and provided with vertically spaced openings or orifices 45 in its side through which liquid may flow from the tank 10 to the receptacle 40 therebeneath. The tops of the tubes are below the top of the tank.

The tank 10 is preferably made in sections to facilitate manufacture and erection, there being two side sections 47 and 48 and an intermediate section 49. Additional intermediate sections may be added to increase the width of the tank. The joints 51 between adjacent tank sections preferably extend along zig-zag lines between the slots 28, instead of intersecting the slots as in prior constructions. This not only strengthens the tank, but it also facilitates its manufacture and avoids difficulties caused by failure of the slot edges to match properly at assembly. The joints 51 can be calked or rendered leak-proof in any other suitable manner.

It will be noted that there are an odd number of transverse rows of deflector plates, viz. five in the embodiment illustrated. As a result of this odd number of rows, the first and last rows are inclined in the same direction, and it is therefore possible to make the side sections 47 and 48 identical and interchangeable. This is of course desirable, since it reduces the investment required in pattern equipment for the manufacture of the scrubber.

The operation of the invention will now be apparent from the above disclosure. Water or other suitable liquid is supplied to the tank 10, the water level being normally below the tops of the tubes 44. The water flows through such of the orifices 45 as are submerged and enters the receptacles 40, whence it is discharged through the orifices 41 in jets which impinge on the deflector plates 26, thus forming downwardly flowing films of water on these plates. The gas delivered by the duct 23 enters the passage 12 and flows in contact with the deflector plates, the water films serving to remove dust particles from the gas. The clean gas escapes through the duct 24.

If the gas pressure in the passage 12 decreases for any reason, the flow through the orifices 45 will increase momentarily until the water level has been lowered sufficiently to provide stable flow conditions. Moreover, as the water level is lowered, there will be a less number of the orifices 45 submerged, and this fact will tend to counteract the increased flow produced by the gas pressure decrease. This makes it possible to maintain a substantially constant flow despite a large variation in gas pressure and without necessitating an excessive variation in water level. If the water level should at any time rise above the tops of the tubes 44, it can enter these tubes through their open ends, so that they act as safety devices to prevent overflow of the liquid from the tank.

The tank 10 is greatly strengthened by the ribs 32, so that it is well able to support the weight of the water and of the deflector plates. Since the gas does not contact with the tank, it will not be subjected to the action of corrosive elements in the gas. The liner plate 34 is of simple shape and can be made of corrosion resisting material without rendering the cost prohibitive. Since the ribs 32 are substantially coextensive vertically with the receptacles 40, the construction does not increase the overall height required.

Having thus described my invention, what I claim as new and desire to secure by Letters Patent is:

1. A gas scrubber comprising a tank having a substantially horizontal bottom wall, a liner plate beneath the bottom wall and supported thereby to form the upper wall of a gas passage, deflecting members located in the gas passage, and means to distribute liquid from the tank to the deflecting members.

2. A gas scrubber comprising a tank having a substantially horizontal bottom wall provided with ribs on its lower face, a liner plate beneath the wall and supported thereby to form the upper wall of a gas passage, deflecting members located in the gas passage, and means to distribute liquid from the tank to the deflecting members.

3. A gas scrubber comprising a tank having a substantially horizontal bottom wall, a liner plate beneath the bottom wall and supported thereby to form the upper wall of a gas passage, deflecting members located in the gas passage and supported at their upper ends from the liner plate, and means to distribute liquid from the tank to the deflecting members.

4. A gas scrubber comprising a tank having a substantially horizontal bottom wall provided with ribs on its lower face, a liner plate beneath the wall and supported thereby to form the upper wall of a gas passage, deflecting members located in the gas passage and supported at their upper ends from the liner plate, and means to distribute liquid from the tank to the deflecting members.

5. A gas scrubber comprising a tank having a substantially horizontal bottom wall provided with ribs on its lower face, a liner plate beneath the wall and supported thereby to form the upper wall of a gas passage, the liner plate having a series of slots therein, deflector plates located in the gas passage with their upper ends supported in the slots, and means to distribute liquid from the tank to the deflector plates.

6. A gas scrubber comprising a tank having a substantially horizontal bottom wall provided with ribs on its lower face, a liner plate beneath the wall and supported thereby to form the upper wall of a gas passage, the liner plate having a series of slots therein, deflector plates located in the gas passage with their upper ends in the slots, the deflector plates having lugs at their upper ends which engage the upper surface of the liner plate adjacent the slots, and means to distribute liquid from the tank to the deflector plates.

7. A gas scrubber comprising a tank having a substantially horizontal bottom wall provided with ribs on its lower face, a liner plate beneath the wall and supported thereby to form the upper wall of a gas passage, the liner plate having a series of slots therein, deflector plates located in the gas passage with their upper ends in the slots, receptacles mounted above the deflector plates and between the ribs, each receptacle being arranged to distribute liquid over the surface of the deflector plate therebeneath, and means to distribute liquid from the tank to the receptacles.

8. A gas scrubber comprising a tank having a substantially horizontal bottom wall provided with ribs on its lower face, a liner plate beneath the wall and supported thereby to form the upper wall of a gas passage, the liner plate having a series of slots therein, deflector plates located in the gas passage with their upper ends in the slots, receptacles mounted above the deflector plates and between the ribs, each receptacle being arranged to distribute liquid over the surface of the deflector plate therebeneath, the bottom wall of the tank having slots therein located above the receptacles, and cover plates closing the last mentioned slots and provided with openings through which liquid may flow from the tank to the receptacles.

9. A gas scrubber comprising a tank having a substantially horizontal bottom wall provided with ribs on its lower face, a liner plate beneath the wall and supported thereby to form the upper wall of a gas passage, the liner plate having a series of slots therein, deflector plates located in the gas passage with their upper ends in the slots, the deflector plates being ararnged in transverse rows with the plates in adjacent rows inclined in opposite directions with respect to the general direction of the gas flow, the ribs being arranged in a zig-zag formation between and parallel to the deflector plates, and means to distribute liquid from the tank to the deflector plates.

10. A gas scrubber comprising a tank mounted above a gas passage and constructed of two side sections and one or more intermediate sections, deflector plates located in the gas passage and arranged in an odd number of transverse rows with the plates in adjacent rows inclined in opposite directions with respect to the general direction of gas flow, the bottom wall of the tank having slots therein above the deflector plates, and cover plates over the slots provided with openings through which liquid may flow from the tank to the deflector plates, the two side sections of the tank being identical and interchangeable.

11. A gas scrubber comprising a tank mounted above a gas passage and constructed of two side sections and one or more intermediate sections, deflector plates located in the gas passage and arranged in transverse rows with the plates in adjacent rows inclined in opposite directions with respect to the general direction of gas flow, the bottom wall of the tank having slots therein above the deflector plates, and cover plates over the slots provided with openings through which liquid may flow from the tank to the deflector plates, the joints between adjacent tank sections extending along zig-zag lines between the slots.

12. A gas scrubber comprising a tank mounted above a gas passage, deflecting members located in the gas passage, and tubes projecting upwardly into the tank and above the normal level of liquid therein to distribute liquid from the tank to the deflecting members, each tube having an opening in the side thereof through which liquid may enter the tube, the tops of the tubes being open and below the top of the tank to act as safety devices and prevent possible overflow of the liquid from the tank.

KEVORK K. NAHIGYAN.